United States Patent
Grover et al.

(10) Patent No.: US 6,869,469 B2
(45) Date of Patent: Mar. 22, 2005

(54) GAS-LIQUID SEPARATOR FOR FUEL CELL SYSTEM

(75) Inventors: Trevor T. Grover, Rushville, NY (US); Jameson R. Forte, Rochester, NY (US)

(73) Assignee: General Motors Corporation, Detroit, MI (US)

(*) Notice: Subject to any disclaimer, the term of this patent is extended or adjusted under 35 U.S.C. 154(b) by 131 days.

(21) Appl. No.: 10/251,427

(22) Filed: Sep. 20, 2002

(65) Prior Publication Data
US 2003/0019363 A1 Jan. 30, 2003

Related U.S. Application Data

(62) Division of application No. 09/692,756, filed on Oct. 19, 2000, now Pat. No. 6,485,854.

(51) Int. Cl.[7] .................................................. B01D 45/14
(52) U.S. Cl. ............................................. 96/417; 55/406
(58) Field of Search ............................. 96/417; 55/406, 55/407, 400, 404; 95/270

(56) References Cited

U.S. PATENT DOCUMENTS

| | | | |
|---|---|---|---|
| 2,509,173 A | * 5/1950 | Schreier | 96/333 |
| 2,569,567 A | * 10/1951 | Korn | 55/403 |
| 2,991,844 A | * 7/1961 | Nomar | 55/403 |
| 3,234,716 A | * 2/1966 | Roger et al. | 210/360.1 |
| 4,108,620 A | * 8/1978 | Bohme et al. | 96/397 |
| 4,128,700 A | 12/1978 | Sederquist | |
| 4,361,490 A | * 11/1982 | Saget | 210/787 |
| 4,460,393 A | * 7/1984 | Saget | 55/406 |
| 4,478,718 A | * 10/1984 | Saget | 210/512.3 |
| 4,659,634 A | 4/1987 | Struthers | |
| 4,670,359 A | 6/1987 | Beshty et al. | |
| 4,816,353 A | 3/1989 | Wertheim et al. | |
| 4,923,768 A | 5/1990 | Kaneko et al. | |
| 4,994,331 A | 2/1991 | Cohen | |
| 5,229,014 A | * 7/1993 | Collins | 210/787 |
| 5,244,479 A | * 9/1993 | Dean et al. | 96/174 |
| 5,248,567 A | 9/1993 | Amemiya et al. | |
| 5,372,617 A | 12/1994 | Kerrebrock et al. | |
| 5,431,228 A | 7/1995 | Weingarten et al. | |
| 5,518,828 A | 5/1996 | Senetar | |
| 5,525,034 A | 6/1996 | Hays | |
| 5,605,770 A | 2/1997 | Andreoli et al. | |
| 5,693,125 A | * 12/1997 | Dean | 96/157 |
| 5,702,838 A | 12/1997 | Yasumoto et al. | |
| 5,763,113 A | 6/1998 | Meltser et al. | |
| 5,851,396 A | * 12/1998 | Saget | 210/512.3 |
| 6,045,933 A | 4/2000 | Okamoto | |
| 6,344,588 B1 | 2/2002 | Van Wijck | |
| 6,402,799 B1 | * 6/2002 | Kokubo et al. | 55/396 |
| 2003/0233939 A1 | * 12/2003 | Szepessy et al. | 95/270 |

* cited by examiner

Primary Examiner—Duane S. Smith
(74) Attorney, Agent, or Firm—Harness, Dickey & Pierce, P.L.C.

(57) ABSTRACT

A fuel cell system having a gas-liquid separator that comprises (a) a housing defining an inlet, an outlet, and a longitudinal flow through passage extending between the inlet and the outlet; (b) a plurality of baffles arranged in longitudinally spaced serial relation in and along the passage and each blocking a portion of the cross section of the passage; and (c) means mounting the baffles for relative movement to selectively vary the composite cross-sectional blockage defined by the baffles relative to a sensed parameter of the fuel cell system.

14 Claims, 5 Drawing Sheets

GAS-LIQUID SEPARATOR FOR FUEL CELL SYSTEM

CROSS-REFERENCE TO RELATED APPLICATIONS

This application is a divisional of U.S. patent application Ser. No. 09/692,756 filed on Oct. 19, 2000, issued as U.S. Pat. No. 6,485,854 on Nov. 20, 2002.

FIELD OF THE INVENTION

This invention relates to a fuel cell system and more particularly to a system having a plurality of cells which consume an $H_2$-rich gas to produce power.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which (1) serve as current collectors for the anode and cathode, and (2) contain appropriate channels and/or openings therein for distributing the fuel cell's gaseous reactants over the surfaces of the respective anode and cathode catalysts. The term fuel cell is typically used to refer to either a single cell or a plurality of cells (stack) depending on the context. A plurality of individual cells are commonly bundled together to form a fuel cell stack and are commonly arranged in series. Each cell within the stack comprises the membrane electrode assembly (MEA) described earlier, and each such MEA provides its increment of voltage. A group of adjacent cells within the stack is referred to as a cluster. Typical arrangements of multiple cells in a stack are described in U.S. Pat. No. 5,763,113, assigned to General Motors Corporation.

In PEM fuel cells, hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$), or $O_2$ in combination with other gases. The solid polymer electrolytes are typically made from ion exchange resins such as perfluoronated sulfonic acid. The anode/cathode typically comprises finely divided catalytic particles, which are often supported on carbon particles, and mixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

For vehicular applications, it is desirable to use a liquid fuel such as an alcohol (e.g., methanol or ethanol), or hydrocarbons (e.g., gasoline) as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished within a chemical fuel processor or reformer. The fuel processor contains one or more reactors wherein the fuel reacts with steam and sometimes air, to yield a reformate gas comprising primarily hydrogen and carbon dioxide. For example, in the steam methanol reformation process, methanol and water (as steam) are ideally reacted to generate hydrogen and carbon dioxide. In reality, carbon monoxide and water are also produced. In a gasoline reformation process, steam, air and gasoline are reacted in a fuel processor which contains two sections. One is primarily a partial oxidation reactor (POX) and the other is primarily a steam reformer (SR). The fuel processor produces hydrogen, carbon dioxide, carbon monoxide and water. Downstream reactors may include a water/gas shift (WGS) and preferential oxidizer (PROX) reactors. In the PROX, carbon dioxide ($CO_2$) is produced from carbon monoxide (CO) using oxygen from air as an oxidant. Here, control of air feed is important to selectively oxidize CO to $CO_2$.

Fuel cell systems which process a hydrocarbon fuel to produce a hydrogen-rich reformate for consumption by PEM fuel cells are known and are described in co-pending U.S. patent application Ser. Nos. 08/975,422 and 08/980,087, filed in November, 1997, and respectively issued as U.S. Pat. No. 6,232,005 on May 15, 2001 and U.S. Pat. No. 6,077,620 on Jun. 20, 2000, and U.S. Ser. No. 09/187,125, filed in November, 1998, and issued as U.S. Pat. No. 6,238,815 on May 29, 2001, and each assigned to General Motors Corporation, assignee of the present invention; and in International Application Publication Number WO 98/08771, published March 5, 1998. A typical PEM fuel cell and its membrane electrode assembly (MBA) are described in U.S. Pat. Nos. 5,272,017 and 5,316,871, issued respectively Dec. 21, 1993 and May 31, 1994, and assigned to General Motors Corporation.

Efficient operation of a fuel cell system depends on the ability to provide effective water management in the system and specifically to control the recovery and recycling of water in the system.

A fuel cell system produces water as a product of the electrochemical reaction that occurs in a fuel cell stack. The physical state of the product water depends on the temperature and pressure at which the electrochemical reaction occurs. It can be generally stated that the product water will be vapor at higher temperatures and lower pressures, and liquid at lower temperatures and higher pressures. Therefore, it is possible that the product water exist as liquid when the fuel cell stack is cool, and gradually transition to water vapor when the stack reaches full operating temperature.

It is necessary to continually recover the product water so that it may be used for other purposes within the fuel cell systems such, for example, as to provide water to the fuel processor as a reactant. The water is recovered differently depending on the physical state. When in liquid form, the product water is typically recovered by a mechanical water separator, and when the product water is vapor it is typically recovered by a condenser. This invention relates to the mechanical water separator to recover the liquid water when present.

Design of a mechanical liquid water separator presents a tradeoff between separating efficiency, gas flow pressure drop, and physical volume. The objective is to maximize separating efficiency, minimize gas flow pressure drop, and minimize physical volume of the component. Maximum separating efficiency is desired so that sufficient product water is recovered for other uses in the system. Minimal pressure drop is desired to minimize the power requirements in the system, thus increasing overall system efficiency. Minimum physical volume is desired so that the component may be easily packaged in an automotive fuel cell application.

Currently available industrial water separators are designed for specific, dedicated gas flow rates and water loading. Because gas flow rates and liquid water loading in a fuel cell system are not constant, current separator designs must be sized for the highest gas flow rates and worst water loading possible. The consequence of this is an over-designed component that experiences the maximum gas flow and/or water loading only for a small percentage of time (i.e. start-up conditions). The over-designed component provides the fuel cell system with high pressure drop (inefficiency), or large physical volume, which makes it non-useful in an automotive fuel cell application.

SUMMARY OF THE INVENTION

The present invention overcomes the problem described. It provides the ability to separate liquid water when it exists and it allows gas (including water vapor) to freely flow through when no liquid water exists. The advantage is that the pressure drop in the device is only recognized by the system when the component is actively functioning. When there is no need for the component, due to the lack of liquid water, the system does not recognize its presence thus increasing overall system efficiency. Also, there is an opportunity for the device to be a smaller volume because it is functional for only a small fraction of the time. That is, the smaller volume will generate higher pressure drop but the impact to system efficiency will be minimized because the device is functional for a small percent of the time. Furthermore, when liquid water does exist it is possible to control the separation efficiency according to water recovery requirements.

According to the invention, the separator comprises a housing defining an inlet, an outlet, and a longitudinal flow through passage extending between the inlet and the outlet; a plurality of baffles arranged in longitudinally spaced serial relation in and along the passage and each blocking a portion of the cross section of the passage; and means mounting the baffles for relative movement to selectively vary the composite cross-sectional blockage defined by the baffles. With this arrangement, the individual baffles may be selectively adjusted to selectively vary the composite cross-sectional blockage defined by the baffles and thereby customize the separator to accommodate the specific gas flow rates and water loading being instantaneously encountered in the system.

According to a further feature of the invention, each baffle is mounted for rotation about a central axis extending through the passage. This specific arrangement facilitates the relative adjustment of the baffles to accommodate a particular water loading scenario.

According to a further feature of the invention, each baffle includes a central hub positioned on the axis and a plurality of circumferentially spaced vanes extending radially outwardly from the hub. This specific arrangement further facilitates the ability to readily adjust the separator to accommodate a specific water loading scenario.

According to a further feature of the invention, the vanes of each baffle block a given percentage of the cross-sectional area of the passage so that first and second successive baffles in the passage may be relatively rotated to define a composite cross-sectional blockage varying from the given percentage of the cross-sectional passage area to a larger percentage of the cross-sectional passage area. For example, the vanes of each baffle may block approximately one half of the cross-sectional area of the passage so that the first and second successive baffles in the passage may be relatively rotated to define a composite cross-sectional blocking varying from approximately one half of the cross-sectional passage area to essentially all of the cross-sectional passage area.

According to a further feature of the invention, the separator further includes means operative to relatively move the baffles in response to sensed system parameters.

According to a further feature of the invention, the moving means comprises an actuator drivingly associated with the baffles and means operative to generate a control signal for delivery to the actuator reflecting sensed parameters of the fuel cell. This arrangement allows the separator to adjust automatically to accommodate the instantaneous water loading situation being encountered in the fuel cell system.

According to a further feature of the invention, the sensed parameters of the fuel cell include one or more of the humidity of a compressed gas stream delivered to the fuel cell, the mass flow rate of the gas stream, the temperature and pressure within the fuel cell, and the electrical current produced by the fuel. These parameters in various combinations provide a measure of the instantaneous water loading status of the fuel cell and thereby provide a means of generating a signal that allows the separator to adjust to reflect the instantaneous water loading status of the system.

According to a further feature of the invention, the separator includes a central shaft positioned on the axis, and the central hubs are annular and are fitted over the shaft in serial stacked relation. This arrangement allows the baffles to be provided in modular form so to as to be readily added to or subtracted from the system to adjust the system to varying water loading scenarios.

According to a further feature of the invention, the housing is sectional and includes modular components which may be interchanged to vary the size of the housing in accordance with the number of baffle modules employed. This arrangement allows the overall separator assembly to be readily customized to the specific water loading conditions being encountered.

According to a further feature of the invention, the actuator rotatably drives the shaft and selected hubs of selected modular baffles are keyed to the shaft so that rotation of the shaft by the actuator relatively rotates the baffles. This arrangement provides a ready and efficient means of relatively moving the baffles to vary the flow characteristic of the separator in accordance with the signal being received by the actuator.

According to a further feature of the invention, the separator is arranged to receive the cathode effluent from the fuel cell and functions to separate the water from the cathode effluent for delivery as a water reactant to the fuel processor.

According to a further feature of the invention, a separator as described is also provided to receive the anode effluent from the fuel cell and/or to receive the reformate upstream of the fuel cell. These further separators provide a further means of effectively removing water from the system for delivery to the fuel processor as a water reactant.

In an alternate embodiment of the invention, the means for relatively moving the baffles comprise bimetal means drivingly associated with selected baffles and operative to relatively move the baffles in response to environmental temperature variations. This arrangement provides a passive system for controlling the relative positions of the baffles as opposed to the active system provided by the actuator driving a shaft mounting the baffles.

BRIEF DESCRIPTION OF THE DRAWINGS

The various features, advantages and other uses of the present invention will become more apparent by referring to the following description and drawings in which.

DETAILED DESCRIPTION OF THE PREFERRED EMBODIMENTS

Figure 1:
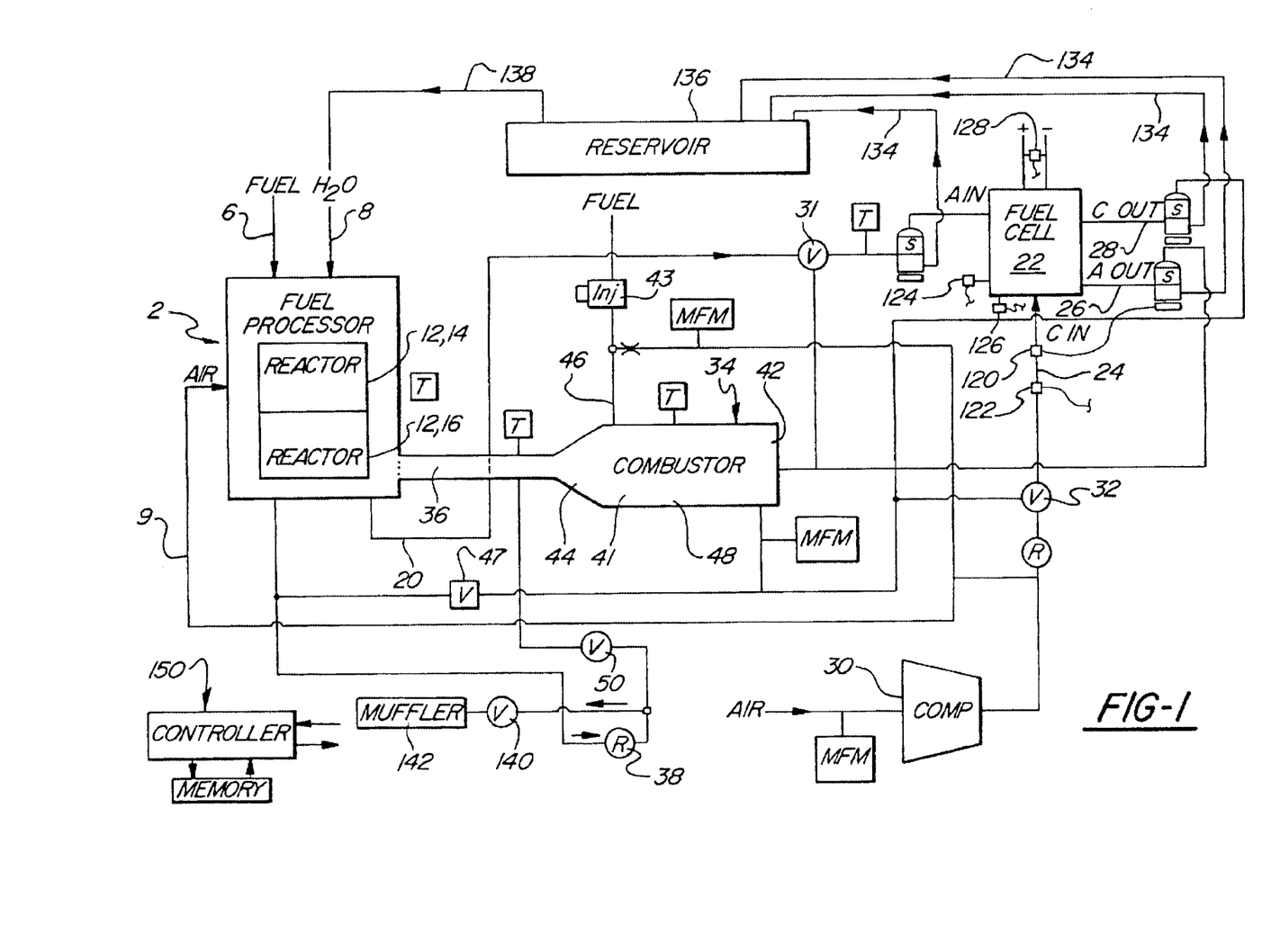
FIG. 1 is a schematic representation of a fuel cell system employing one or more water separators according to the invention.

The structure and operation of the water separator of invention may be further understood with reference to the fuel cell system shown in FIG. 1 by example only. Therefore, before further describing the water separator of the invention, it is useful to understand the system within which the water separator functions.

FIG. 1 illustrates an example of a fuel cell system. The system may be used in a vehicle (not shown) as an energy source for vehicle propulsion. In the system, a hydrocarbon is processed in a fuel processor, for example, by reformation and preferential oxidation processes, to produce a reformate gas which has a relatively high hydrogen content on a volume or molar basis. Therefore, reference is made to hydrogen-rich or relatively high hydrogen content.

The invention is hereafter described in the context of a fuel cell fueled by an $H_2$-rich reformate regardless of the method by which such reformate is made. It is to be understood that the principles embodied herein are applicable to fuel cells fueled by $H_2$ obtained from any source, including reformable hydrocarbon and hydrogen-containing fuels such as methanol, ethanol, gasoline, alkene, or other aliphatic or aromatic hydrocarbons, or $H_2$ stored on board.

As shown in FIG. 1, a fuel cell apparatus includes a fuel processor 2 for catalytically reacting a reformable hydrocarbon fuel stream 6, and water in the form of steam from a water stream 8. In some fuel processors, air is also used in a combination preferential oxidation/steam reforming reaction. In this case, fuel processor 2 also receives an air stream 9. The fuel processor contains one or more reactors 12 wherein the reformable hydrocarbon fuel in stream 6 undergoes dissociation in the presence of water/steam 8 and sometimes air (in stream 9) to produce the hydrogen-rich reformate. Further, each reactor 12 may comprise one or more reactor beds. Reactor 12 may have one or more sections or beds, and a variety of designs are known and usable. Therefore, the selection and arrangement of reactors 12 may vary; and exemplary fuel reformation reactor(s) 14 and downstream reactor(s) 16 are described immediately below.

By way of example, in an exemplary steam/methanol reformation process, methanol and water (as steam) are ideally reacted in a reactor 14 to generate hydrogen and carbon dioxide as described earlier in the background. In reality, carbon monoxide and water are also produced. By way of further example, in an exemplary gasoline reformation process, steam, air and gasoline are reacted in a fuel processor which comprises a reactor 14 which has two sections. One section of the reactor 14 is primarily a partial oxidation reactor (POX) and the other section of the reactor is primarily a steam reformer (SR). As in the case of methanol reformation, gasoline reformation produces the desired hydrogen but, in addition, produces carbon dioxide, water and carbon monoxide. Therefore, after each type of reformation, it is desirable to reduce the carbon monoxide content of the product stream.

Accordingly, the fuel processor typically also includes one or more downstream reactors 16, such as water/gas shift (WGS) and preferential oxidizer (PROX) reactors which are used to produce carbon dioxide from carbon monoxide, as described earlier in the background. Preferably, the initial reformate output gas stream which comprises hydrogen, carbon dioxide, carbon monoxide and water is further treated in a preferential oxidation (PROX) reactor 16 to reduce the CO-levels therein to acceptable levels, for example, below 20 ppm. Then, during running mode, the $H_2$ rich reformate 20 is fed through valve 31 into the anode chamber of a fuel cell stack 22. At the same time, oxygen (e.g., air) from an oxidant stream 24 is fed into the cathode chamber of the fuel cell 22. The hydrogen from the reformate stream 20 and the oxygen from the oxidant stream 24 react in the fuel cell 22 to produce electricity and water as a byproduct which is produced at the cathode.

Exhaust or effluent 26 from the anode side of the fuel cell 22 contains some unreacted hydrogen. The exhaust or effluent 28 from the cathode side of the fuel cell 22 contains some unreacted oxygen. Air for the oxidant stream 24 is provided by an air supply, preferably a compressor 30. Air from the air supply (compressor 30) is directed to the fuel cell 22 by a valve 32 under normal operating conditions. During start-up, however, the valve 32 is actuated to provide air directly to the input of a combustor 34. The air is used in combustor 34 to react with a fuel supplied through line 46. The heat of combustion is used to heat various parts of the fuel processor 2.

It should be noted that some of the reactions which occur in fuel processor 2 are endothermic and so require heat; other reactions are exothermic and require removal of heat. Typically, the PROX reactor 16 requires removal of heat. One or more of the reformation reactions in reactor 14 are typically endothermic and require heat added. This is typically accomplished by preheating reactants, fuel 6, steam 8, and air 9 and/or by heating selected reactors.

Heat from the combustor 34 heats selected reactors and reactor beds in the fuel processor 2 during start-up. The combustor 34 achieves heating of the selected reactors and beds in the fuel processor, as necessary, by indirect heat transfer thereto. Typically, such indirectly heated reactors comprise a reaction chamber with an inlet and an outlet. Within the reaction chamber, the beds are in the form of carrier member substrates each having a first surface carrying catalytically active material for accomplishing the desired chemical reactions. A second surface opposite the first surface is for heat transfer from hot gases to the carrier member substrates. In addition, the combustor 34 is usable to preheat the fuel 6, water 8 and air 9 being supplied as reactants to the fuel processor 2.

It should be noted that the air 9 supplied to the fuel processor 2 may be used in one or more of the reactors 12. If reactor 14 is a gasoline reformation reactor, then air from line 9 is supplied to reactor 14. The PROX reactor 16 also utilizes air to oxidize CO to $CO_2$ and also receives air from air supply source (compressor 30) via line 9.

The combustor 34 defines a chamber 41 with an inlet end 42, an exhaust end 44 and a catalyst section 48 between the ends. Hydrocarbon fuel is injected into the combustor. The hydrocarbon fuel, if in liquid form, is preferably vaporized either before being injected into the combustor or in a section of the combustor to disperse the fuel for combustion. Vaporization may be done by an electric heater. Once the system is operating and the combustor has heated up, vaporization may occur by heat exchange using heat from the combustor exhaust to vaporize incoming fuel. Preferably, a fuel metering device 43 is provided to control the rate at which hydrocarbon fuel is provided to the combustor.

The hydrocarbon fuel 46 and the anode effluent 26 are reacted in the catalyst section 48 of the combustor 34, which section is between the inlet and exhaust ends 42 and 44, respectively, of the combustor 34. Oxygen is provided to the combustor 34 either from the air supply (i.e., compressor 30) via valve 32 or from a second air flow stream, such as a cathode effluent stream 28, depending on system operating conditions. A valve 50 permits release of the combustor exhaust 36 to atmosphere when it is not needed to heat reactors in the fuel processor 2.

As can be seen, the hydrocarbon fuel stream 46 supplements the anode effluent 26 as fuel for the combustor 34, as may be needed, to meet the transient and steady state needs of the fuel cell apparatus. In some situations, exhaust gas passes through a regulator 38, a shutoff valve 140 and a muffler 142 before being released to the atmosphere. In FIG. 1, the symbols are as follows: V is valve, MFM is mass flow meter, T is temperature monitor, R is regulator, C is cathode side and A is anode side of a fuel cell, INJ is injector, COMP is compressor, and S is water separator.

The amount of heat demanded by the selected reactors within the fuel processor 2, which is to be supplied by the combustor 34, is dependent upon the amount of fuel and water input and ultimately the desired reaction temperature in the fuel processor 2. As stated earlier, sometimes air is also used in the fuel processor reactor and must also be considered along with the fuel and water input. To supply the heat demand of the fuel processor 2, the combustor 34 utilizes all anode exhaust or effluent and potentially some hydrocarbon fuel. Enthalpy equations are used to determine the amount of cathode exhaust air to be supplied to the combustor 34 to meet the desired temperature requirements of the combustor 34 and the combustor 34 ultimately satisfies the heat demanded by the fuel processor 2. The oxygen or air provided to the combustor 34 includes one or both of cathode effluent exhaust 28, which is typically a percentage of the total oxygen supplied to the cathode of the fuel cell 22, and a compressor output air stream depending on whether the apparatus is operating in a start-up mode wherein the compressor air stream is exclusively employed, or in a run mode using the cathode effluent 28 and/or compressor air. In the run mode, any total air, oxygen or diluent demand required by the combustor 34, which is not met by the cathode effluent 28, is supplied by the compressor 30 in an amount to satisfy the temperature and heat demanded by the combustor 34 and the fuel processor 2, respectively. The air control is implemented via an air dilution valve 47 which preferably is a stepper motor driven valve having a variable orifice to control the amount of bleed-off of cathode exhaust 28 supplied to the combustor 34.

In this exemplary representation of a fuel cell apparatus, operation is as follows. At the beginning of operations when the fuel cell apparatus is cold and starting up: (1) the compressor 30 is driven by an electric motor energized from an external source (e.g., a battery) to provide the necessary system air; (2) air is introduced into the combustor 34; hydrocarbon fuel 46 (e.g., MeOH or gasoline) is injected into the combustor 34; (3) the air and fuel react in the combustor 34, where substantially complete combustion of the fuel is effected; and (4) the hot exhaust gases exiting the combustor 34 are conveyed to the selected reactors 12 associated with the fuel processor 2.

Once the reactors in the fuel processor 2 have attained adequate temperature, the reformation process begins and the process includes the following: (1) valve 32 is activated to direct air to the cathode side of the fuel cell 22; (2) fuel and water are fed to the fuel processor 2 to commence the reformation reaction; (3) reformate exiting the fuel processor 2 is fed to the anode side of the fuel cell 22; (4) anode effluent 26 from the fuel cell 22 is directed into the combustor 34; (5) cathode effluent 28 from the fuel cell 22 is directed into the combustor 34; (6) the fuel, air, cathode effluent 28 and anode effluent 26 are burned in the combustor 34. In a preferred sequence, step (2) is implemented first along with the supplying of air directly to the combustor. Then, when the hydrogen-rich stream has adequately low CO level, steps (1) and (3) are implemented, followed by steps (4), (5) and (6).

Under certain conditions, the combustor 34 could operate solely on the anode and cathode effluents, without the need for additional hydrocarbon fuel 46. Under such conditions, fuel injection to the combustor 34 is discontinued. Under other conditions, e.g., increasing power demands, supplemental fuel 46 is provided to supplement the Aout (26) to the combustor 34. It can be seen that the combustor 34 receives multiple fuels, such as a hydrocarbon fuel as well as anode effluent 26 from the anode of the fuel cell 22. Oxygen depleted exhaust air 28 from the cathode of the fuel cell 22 and air from the compressor 30 are also supplied to the combustor 34.

According to the present fuel cell system example, a controller 150 shown in FIG. 1 controls various aspects of the operation of the system shown in FIG. 1. The controller 150 may comprise any suitable microprocessor, microcontroller, personal computer, etc., which has central processing unit capable of executing a control program and data stored in a memory. The controller 150 may be a dedicated controller specific to any of the components in FIG. 1, or implemented in software stored in the main vehicle electronic control module. Further, although software based control programs are usable for controlling system components in various modes of operation as described above, it will also be understood that the control can also be implemented in part or whole by dedicated electronic circuitry.

Figure 2:
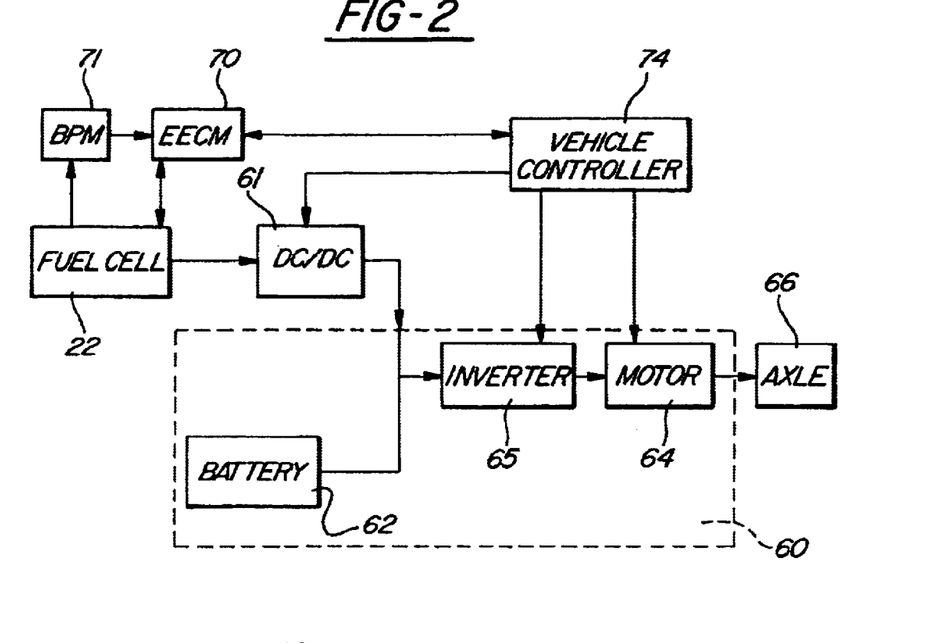
FIG. 2 is a schematic representation of the fuel cell system of the invention as used in a vehicular propulsion system.

In a preferred embodiment, the fuel cell system comprises the fuel cell 22 as part of a vehicle propulsion system 60 (see FIG. 2). Here, a portion of the system 60, comprises a battery 62, an electric motor 64, and associated drive electronics including inverter 65 constructed and arranged to accept electric energy from a DC/DC converter 61 associated with the fuel cell system, and particularly fuel cell 22, and to convert it to mechanical energy produced by motor 64. The battery 62 is constructed and arranged to accept and store electrical energy supplied by fuel cell 22 and to accept and store electrical energy supplied by motor 64 during regenerative braking, and to provide electric energy to motor 64. The motor 64 is coupled to driving axle 66 to rotate wheels of a vehicle (not shown). An electrochemical engine control module (EECM) 70 and a battery pack module (BPM) 71 monitor various operating parameters, including, but not limited to, the voltage and current of the stack. For example, this is done by the battery pack module (BPM) 71, or by the BPM 71 and the EECM 70 together, to send an output signal (message) to the vehicle controller 74 based on conditions monitored by the BPM 71. The vehicle controller 74 controls the electric motor 64, the drive electronics including inverter 65, the DC/DC converter 61, and requests a power level from the EECM 70.

In order to facilitate water management within the system and specifically to recover water from the system for various uses in the system such as to supply the water reactant to the fuel processor, one or more separators S are employed in the system. For example, as shown, a separator S may be positioned to receive the cathode effluent from the fuel cell, a further separator S may be positioned to receive the anode effluent from the fuel cell and a further separator S may be positioned to receive the reformate upstream of the fuel cell. If desired, a further separator (not shown) may be provided in association with the exhaust of the combustor.

With reference to FIGS. 3–8, each separator S, broadly considered, includes a housing assembly 82, a plurality of baffles 84, and mounting and moving means 86. Unless otherwise indicated, the components of the separator are formed of a suitable ferrous material.

Housing assembly 82 includes a circular dome or cover 88, a frustro-conical outlet 90 positioned rigidly and centrally in the dome, a cylindrical glass shell 92, an inlet 94, a cylindrical reservoir 96, a drain 98, and an annular flange 99.

In the assembled relation of the housing assembly, the lower edge of the shell 92 fits telescopically within the upper edge of the reservoir 96 and the upper edge of the shell abuttingly engages the lower edge of the dome 90 with the flange 99 encircling the abutting edges of the dome and the shell. The assembled parts are held together by a plurality of circumferentially spaced rods 100 positioned between lugs 99a provided at circumferentially spaced locations on the flange 99 and lugs 96a provided at circumferentially spaced locations on the upper edge of reservoir 96. Bolts 102 extend through lugs 99a and 96a to threadably engage the upper and lower ends of rods 100 to complete the assembly of the housing. Inlet 94 is fixedly secured to the side wall of reservoir 96 proximate the upper edge of the reservoir and drain 98 is fixedly secured to the side wall of the reservoir proximate the bottom wall of the reservoir.

Each baffle 84 (FIGS. 5, 6, and 7) includes a central annular hub 104 and a plurality of vanes 106 fixedly secured to the outer periphery of the hub at circumferentially spaced locations about the outer periphery of the hub. Each baffle preferably includes two diametrically opposed vanes 106 with the side edges 106a of each vane extending radially outwardly from the hub and the outer edge 106b of each vane circumscribing an arc of approximately 90° so that the two vanes in combination circumscribe an arc of approximately 180°. The vanes preferably have a flat blade-like configuration.

Figures 3, 4, 5:
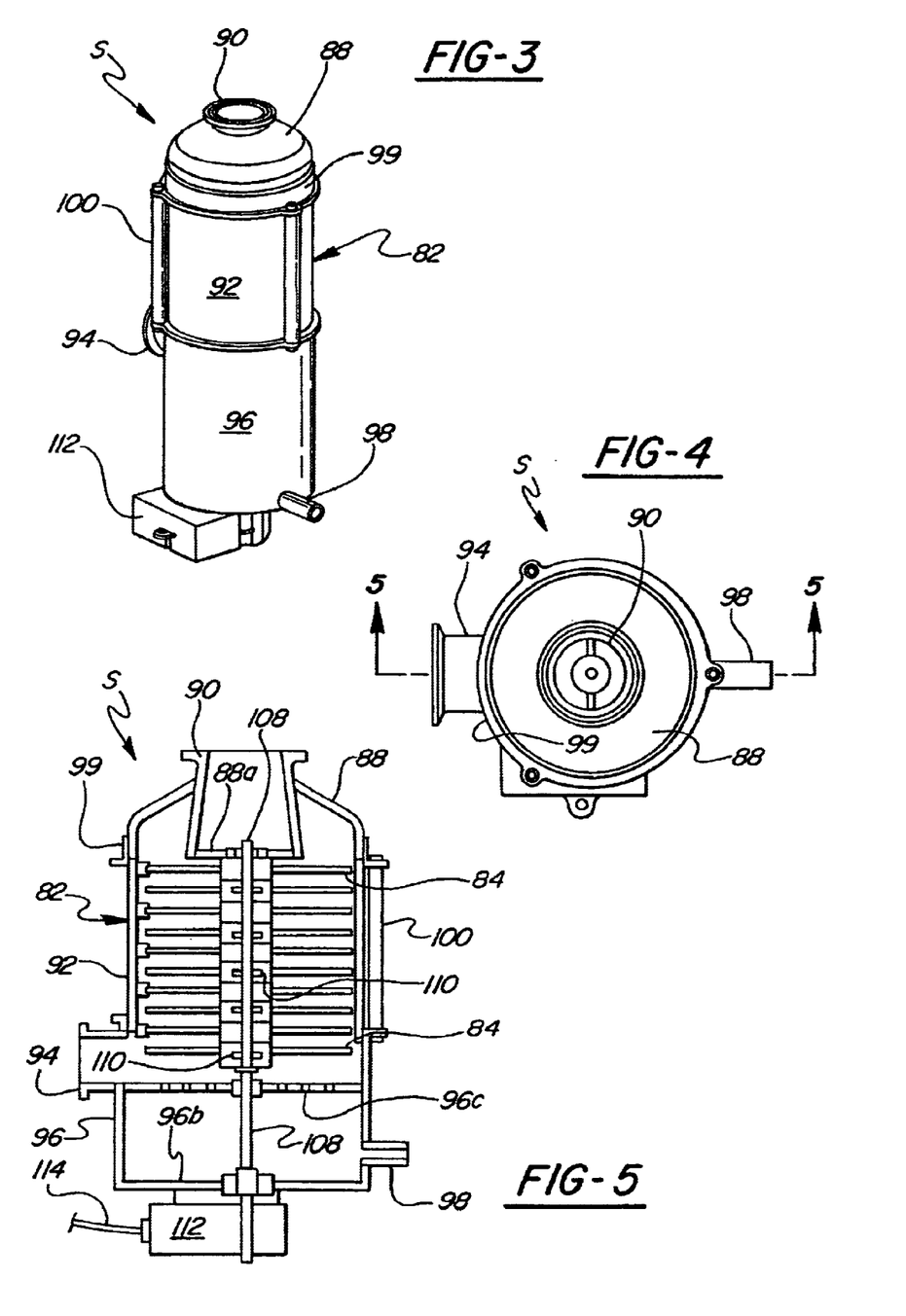
FIG. 3 is a perspective view of a water separator according to the invention.
FIG. 4 is a top view of the water separator.
FIG. 5 is a cross-sectional view taken on line 5—5 of FIG. 4.
Figure 6:
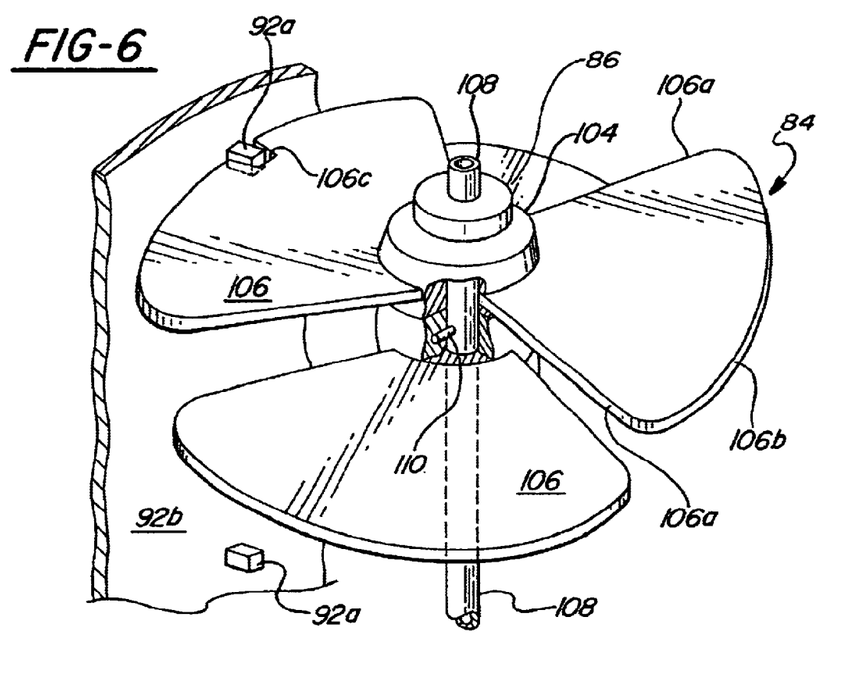
FIG. 6 is a fragmentary perspective view showing portions of the water separator.

Mounting and moving means 86 includes a central shaft 108, shaft pins 110, and an actuator 112.

The lower end of the shaft 108 passes through a hub and bearing structure provided in the bottom wall 96b of the reservoir, the upper end of the shaft is received in a hub and bearing construction provided by a spider 88a at the lower end of the outlet 88, and a central region of the shaft passes through a hub and bearing construction in a partition wall 96c within the reservoir.

Actuator 112 is positioned fixedly beneath the reservoir 96 and drivingly receives the lower end of the shaft 108. Actuator 112 may take various forms depending on the form of energy that is readily available. In the fuel cell system as disclosed, the actuator 112 would preferably comprise an electrical actuator having means not shown which operate in response to receipt of an electrical signal via conduit 114 to impart a rotational movement to the shaft 108.

In the assembled relation of the separator the upper and lower ends of the shaft 108 are supported in the bearing structures provided by the spider 88a and by the lower wall of the reservoir; the modular baffles 84 are positioned in serial stacked relation on the shaft with the lowermost baffle supported by a clip or the like in a position immediately overlying partition 96c, and the uppermost module positioned in immediately underlying relation to the bearing structure of the spider 88a. Every other baffle is fixedly secured to the shaft by pins 110 extending radially outwardly from the shaft for fixed engagement in the hub of that module and the remaining or alternate modules are fixed against rotation relative to the housing by, for example, notches 106c in the outer periphery of one of the vanes of the module engaging a lug 92a on the inner face of the shell 92. With this arrangement as the shaft 108 is rotated by the actuator 112, the baffle modules that are pinned to the shaft rotate with the shaft and the alternate baffle modules that are fixed to the shell remain in a fixed position relative to the shell.

Figure 7A:
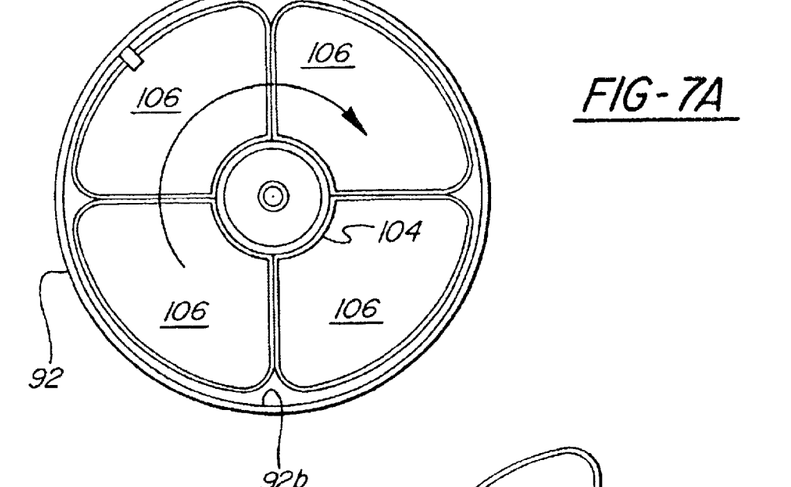
FIGS. 7A, 7B and 7C illustrate the relative movement of baffles employed in the water separator.
Figure 7B:
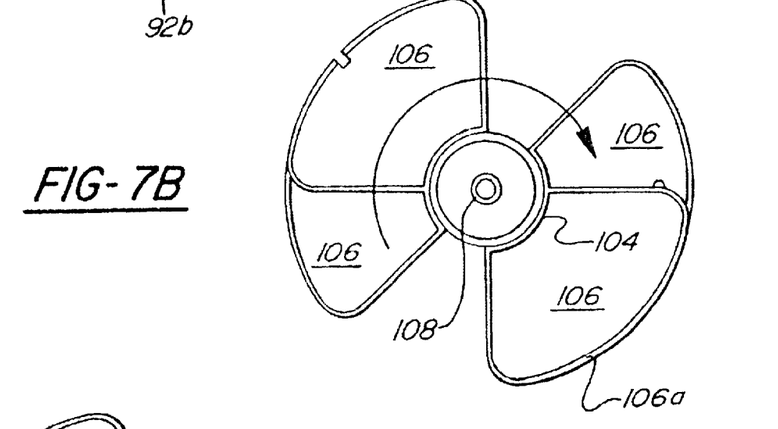
Figure 7C:
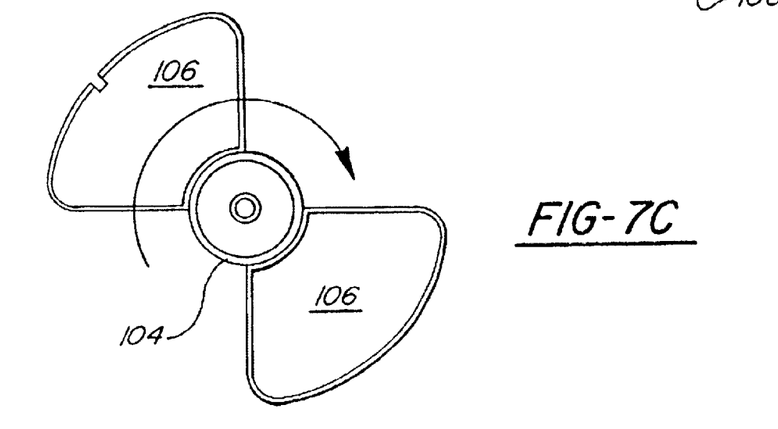
Figure 8:
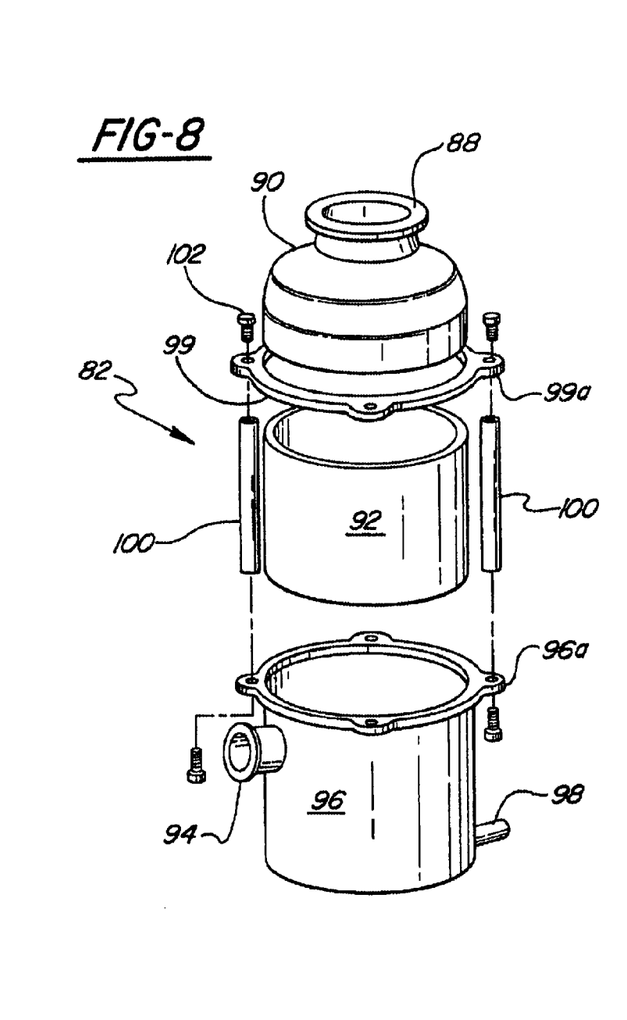
FIG. 8 is an exploded view of the housing of the separator.

With this arrangement, and as best seen in FIGS. 7A–7C, first and second successive stacked baffles in the modular baffle stack may be relatively rotated to define a composite cross-sectional blockage varying from the blockage provided by the vanes of a single modular to a larger blockage provided by the vanes of the combined module depending on whether the vanes of the individual modules are in phase or out of phase. For example, with the two vanes of each module combining to provide an arcuate extent of 180°, the vanes when totally out of phase as seen FIG. 7A combine to compositely block essentially the entire circular passage defined by the inner periphery 92b of the shell 92; the modules when totally in phase as seen in FIG. 7C compositely combine to block only 180° or approximately half of the passage defined by the inner periphery 92b of the shell; and the successive modules, when partially out of phase as seen in FIG. 7B, combine to compositely block a percentage of the passageway greater than one half and less than a totality. Selective actuation of actuator 112 will thus be seen to enable successive baffle modules to be relatively rotated to define a composite cross-sectional blockage of the passage varying from approximately one half of the cross-sectional passage area to essentially all of the cross-sectional passage area.

Actuator 112 is actuated in response to a control signal reflecting sensed parameters of the fuel cell 22. For example (FIG. 1) a sensor 120 may sense the humidity of the compressed gas stream 24 delivered to the fuel cell; a sensor 122 may sense the mass flow rate of the gas stream; the temperature and pressure within the fuel cell may be sensed respectively by sensors 124 and 126; and the electrical current produced by the fuel cell may be sensed by a sensor 128.

It will be understood that one or all of the signals generated by the sensors 120, 122, 124, 126, 128, and 130 are supplied to the actuator 112 via conduit 114 whereby to generate a control signal for delivery to the actuator reflecting one or more sensed parameters of the fuel cell and specifically reflecting the water content of the fluid streams being processed by the respective separators.

It will be seen that the described arrangement enables the flow restriction provided by the separator to be varied infinitely between a maximum flow restriction configuration in which the vanes of each successive set of baffles in the stack are totally out of phase to provide total blockage of the passage at several stage locations along the passage to a configuration in which all of the vanes of all the baffles are in phase whereby to provide a relatively unrestricted flow path through the separator.

It will be understood that the restriction provided by the separator may also be readily varied by varying the number of baffles modules provided in the separator. Specifically, a relatively large number of baffle modules may be provided in association with a relatively long shell 92 or a relatively small number of baffle modules may be stacked on the shaft 108 in association with a relatively short shell 92 with the interchange of the shell modules being readily accomplished by loosening of screws 102 and replacement of the specific shell and the specific rods 100 with a shell size and rod size corresponding to the number of baffle modules being employed. The shaft 108 may also be formed in sections to allow the upper section of the shaft to be interchanged to provide an upper shaft length corresponding to the number of baffle modules being employed.

Figure 9:
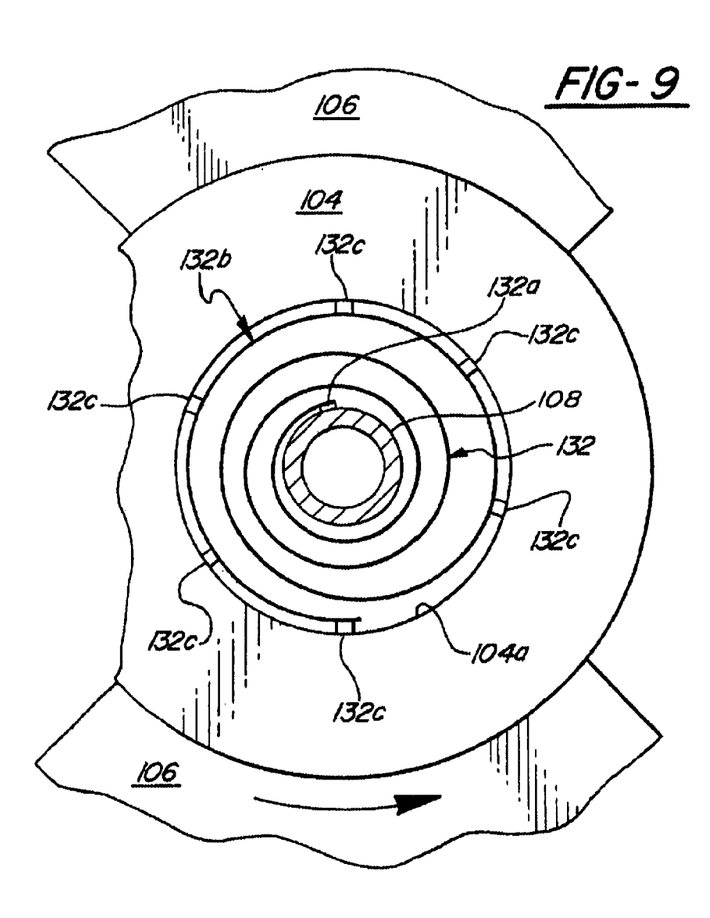
FIG. 9 is a fragmentary view showing an alternate embodiment of the invention separator.

In the embodiment of the invention seen in FIG. 9, the relative movement between the vanes of successive baffles stacked on the shaft, rather than being accomplished by the actuator 112 acting in response to a fuel cell parameter signal received on lead 114, is achieved utilizing an individual coil 132 of bimetallic metal in association with every second baffle module stacked on the shaft 108. Specifically, a bimetal coil 132 is positioned between the inner periphery 104a of the hub of the baffle module and the outer periphery of the shaft 108 with respect to every second module in the stack on the shaft with one end 132a of the bimetal coil fixedly secured to the outer periphery of the shaft 108 and the outer convolution 132b of the bimetal coil fixedly secured to the inner periphery of the hub 104 at circumferentially spaced locations 132c.

With this arrangement, as the environmental temperature conditions within and around the separator vary, the relative restriction provided by the separator may be selectively varied. For example, when the fuel cell system is cold at start-up, the baffles may be positioned in a restricting position since at this time the fuel cell generates liquid water that needs to be separated whereas, as the system heats up and inherently less liquid water is present, the bimetal coils may expand to force the baffles to reposition to a less restricting orientation to reduce the pressure drop. In this way, the system does not sacrifice efficiency when the device is not actively functioning. Passive control as provided by the bimetals eliminates the need for sensors and actuators as employed in the embodiment of FIGS. 3–8 but compromises control precision.

The invention operates on the principle of inertial separation. Inertial separation occurs when water droplets entrained in the gas stream are forced to change direction and the inertia of the moving droplets causes them to strike a physical barrier as they continue in their original direction. When the droplets impact the physical barrier or baffle, they consequently fall out of the stream. Collection efficiency is dependent on the number of baffles in the stack and the velocity of the impinging stream and the angle of attack of the stream on the baffles.

In this invention the baffles are vertically stacked and rotationally oriented on the central shaft. The gas stream containing liquid water enters the side of the device near the bottom through the inlet 94. Bulk water in the stream simply drains to the reservoir 96 through suitable drainage holes in the partition 96c. The droplet entrained flow moves upward through the device. As the flow moves up the water droplets impact the baffle surfaces causing them fall out of the gas stream. The liquid water free gas stream is then exhausted at the top of the device through the outlet 88. The bulk water collected in the reservoir 96 exits through drain 98 and is moved via a conduit 134 to a central reservoir 136 from where the collected water may be moved via a conduit 138 to provide the water reactant for inputting to the fuel processor. As previously noted, a separator S as described may be provided to receive the effluent from the cathode outlet; a further separator S may be provided to receive the effluent from the anode outlet of the fuel cell; a further separator S may be provided to receive the reformate upstream of the fuel cell; and a further separator (not shown) may be provided to receive the exhaust of the combustor with the collected water in each instance being routed to the central reservoir for routing to the fuel processor as the water reactant. Collected water may also be routed to the air stream flowing to the fuel cell through the conduit 24 to control the humidity of the compressed air stream arriving at the fuel cell.

It will be seen that the efficiency of the separator can be readily increased by adding levels of baffles, decreasing baffle spacing, and adjusting rotational orientation of the successive baffles in the stack. All of these parameters are easily adjustable to allow more or less restriction to the flow through the separator. Increased restriction provides higher separating efficiency but higher pressure drop as well. Conversely, decreased restriction provides lower separating efficiency but lower pressure drop.

The invention is unique in that it is designed to minimize pressure drop through the separator when not actively functioning in the fuel cell system and to maximize separating efficiency when it is actively functioning. This is accomplished by controlling the rotational orientation of the baffles. Increased open flow area provides less restriction and the opposite is true for decreased open area. The orientation can be changed actively by electronic actuation utilizing actuators or passively through the use of bimetallic elements.

Active control of the baffle position is based on sensing the liquid water in the system. The amount of liquid water to be separated is dependent on the relative humidity of the compressed gas stream delivered to the fuel cell stack, the current produced in the stack, as well as the temperature and pressure in the stack. Therefore, the sensors in the system for these parameters provide data to a control computer which calculates the mole fraction of water above saturation and appropriately signals actuation of the baffles utilizing actuators 112. Specifically, when the mole fraction of water is above zero, the baffles position to a more restricting orientation in order to separate liquid water. When the calculation yields no fraction of water above saturation, the baffles reposition to a less restricting orientation to reduce the pressure drop through the device. This repositioning may be accomplished in one step or may be accomplished in a series of incremental rotational steps determined by experimental calibration of the separator efficiency for various water and gas flow loading.

The separator of the present invention provides the ability to separate the liquid water when it exists and allows gas including water vapor to freely flow through when no liquid water exists. The advantage of this arrangement is that the pressure drop in the device is only recognized by the system when the component is actively functioning. When there is no need for the component due to lack of liquid water, the system does not recognize its presence thus increasing overall system efficiency. Also, there is an opportunity for the device to be a smaller size or volume because it is functional for only a small fraction of the time. That is, the smaller volume will generate higher pressure drop but the impact to system efficiency is minimized because the device is functional for only a small percentage of the time. Small size is of course critical in any vehicular application.

Furthermore, when liquid water does exist it is possible with this invention to control the separation efficiency according to water recovery requirements.

Although preferred embodiments of the invention have been illustrated and described in detail, it will be apparent that various changes may be made in the disclosed embodiments without departing from the scope or spirit of the invention.

What is claimed is:

1. A fuel cell system having a gas-liquid separator, said gas-liquid separator comprising:
   a housing defining an inlet, an outlet, and a longitudinal flow through passage extending between the inlet and the outlet;
   a plurality of baffles arranged in longitudinally spaced serial relation in and along the passage and each blocking a portion of the cross section of the passage; and
   means mounting the baffles for relative movement to selectively vary the composite cross-sectional blockage defined by the baffles relative to a sensed parameter of the fuel cell system.

2. A fuel cell system having a gas-liquid separator according to claim 1 wherein each baffle is mounted for rotation about a central axis extending through the passage.

3. A fuel cell system having a gas-liquid separator according to claim 2 wherein each baffle includes a central hub positioned on the axis and a plurality of circumferentially spaced vanes extending radially outwardly from the hub.

4. A fuel cell system having a gas-liquid separator according to claim 3 wherein the vanes of each baffle block a given percentage of the cross-sectional area of the passage so that first and second successive baffles in the passage may be relatively rotated to define a composite cross-sectional blockage varying from the given percentage of the cross-sectional passage area to a larger percentage of the cross-sectional passage area.

5. A fuel cell system having a gas-liquid separator according to claim 4 wherein the vanes of each baffle block approximately one half of the cross-sectional area of the passage so that first and second successive baffles in the passage may be relatively rotated to define a composite cross-sectional blockage varying from approximately one half of the cross-sectional passage area to essentially all of the cross-sectional passage area.

6. A fuel cell system having a gas-liquid separator according to claim 1 wherein the separator further includes means operative to relatively move the baffles.

7. A gas-liquid separator comprising:
   a housing defining an inlet, an outlet, and a longitudinal flow through passage extending between the inlet and the outlet;
   a plurality of baffles arranged in longitudinally spaced serial relation in and along the passage and each blocking a portion of the cross section of the passage; and
   means mounting the baffles for relative movement to selectively vary the composite cross-sectional blockage defined by the baffles, wherein
      the separator further includes means operative to relatively move the baffles; and
      the moving means comprises bimetal means drivingly associated with the baffles and operative to relatively move the baffles in response to environmental temperature variations.

8. A gas-liquid separator comprising:
   a housing defining an inlet, an outlet, and a longitudinal flow through passage extending between the inlet and the outlet;
   a plurality of baffles arranged in longitudinally spaced serial relation in and along the passage and each blocking a portion of the cross section of the passage; and
   means mounting the baffles for relative movement to selectively vary the composite cross-sectional blockage defined by the baffles, wherein
      the separator further includes means operative to relatively move the baffles;
      the separator is intended for use in conjunction with a fuel cell; and
      the moving means comprises an actuator drivingly associated with the baffles and means operative to generate a control signal for delivery to the actuator reflecting sensed parameters of the fuel cell.

9. A gas-liquid separator according to claim 8 wherein the sensed parameters of the fuel cell include one or more of the humidity of a compressed gas stream delivered to the fuel cell, the mass flow rate of the gas stream, the temperature a pressure within the fuel cell, and the electrical current produced by the fuel cell.

10. A fuel cell system having a gas-liquid separator according to claim 4 wherein:
    the separator includes a central shaft positioned on the axis; and
    the central hubs are annular and are fitted over the shaft in serial stacked relation.

11. A fuel cell system having a gas-liquid separator according to claim 10 wherein:
    the separator further includes an actuator rotatably driving the shaft; and
    selected hubs of selected baffles are keyed to the shaft so that rotation of the shaft by the actuator relatively rotates the baffles.

12. A fuel cell system having a gas-liquid separator according to claim 10 wherein the baffles are modular units that may be readily slipped on and off of the shaft to vary the number of baffles in the separator and thereby vary the separation efficiency of the separator.

13. A fuel cell system having a gas-liquid separator according to claim 12 wherein the housing is sectional and includes modular components which may be interchanged to vary the size of the housing in accordance with the number of modules employed.

14. A fuel cell system having a gas-liquid separator according to claim 1 wherein the gas-liquid separator comprises a water separator.

* * * * *